(12) United States Patent
Ozaki et al.

(10) Patent No.: US 9,050,583 B2
(45) Date of Patent: Jun. 9, 2015

(54) CARBON CATALYST FOR HYDROGEN PRODUCTION, METHOD FOR PRODUCING CATALYST, AND METHOD FOR PRODUCING HYDROGEN USING CATALYST

(75) Inventors: Jun-ichi Ozaki, Kiryu (JP); Rieko Kobayashi, Chiba (JP); Chihiro Fujii, Yokohama (JP)

(73) Assignees: NATIONAL UNIVERSITY CORPORATION GUNMA UNIVERSITY, Maebashi-shi (JP); NISSHINBO HOLDINGS INC., Tokyo (JP)

( * ) Notice: Subject to any disclaimer, the term of this patent is extended or adjusted under 35 U.S.C. 154(b) by 0 days.

(21) Appl. No.: 13/988,609

(22) PCT Filed: Nov. 1, 2011

(86) PCT No.: PCT/JP2011/075188
§ 371 (c)(1),
(2), (4) Date: May 21, 2013

(87) PCT Pub. No.: WO2012/073639
PCT Pub. Date: Jun. 7, 2012

(65) Prior Publication Data
US 2013/0243687 A1 Sep. 19, 2013

(30) Foreign Application Priority Data
Nov. 29, 2010 (JP) ................................. 2010-265334

(51) Int. Cl.
| | | |
|---|---|---|
| B01J 23/755 | (2006.01) | |
| B01J 23/745 | (2006.01) | |
| C01B 3/26 | (2006.01) | |
| B01J 23/75 | (2006.01) | |
| B01J 21/18 | (2006.01) | |
| B01J 23/78 | (2006.01) | |
| B01J 23/34 | (2006.01) | |
| B01J 23/02 | (2006.01) | |
| B01J 23/74 | (2006.01) | |
| B01J 37/06 | (2006.01) | |
| B01J 37/08 | (2006.01) | |
| C01B 3/22 | (2006.01) | |

(52) U.S. Cl.
CPC ............... *B01J 23/755* (2013.01); *B01J 21/18* (2013.01); *B01J 23/02* (2013.01); *B01J 23/34* (2013.01); *B01J 23/74* (2013.01); *B01J 23/745* (2013.01); *B01J 23/75* (2013.01); *B01J 23/78* (2013.01); *B01J 37/06* (2013.01); *B01J 37/084* (2013.01); *C01B 3/22* (2013.01); *C01B 3/26* (2013.01); *C01B 2203/0277* (2013.01); *C01B 2203/1041* (2013.01); *C01B 2203/1211* (2013.01); *C01B 2203/1217* (2013.01); *C01B 2203/1223* (2013.01); *C01B 2203/1229* (2013.01); *C01B 2203/1235* (2013.01); *C01B 2203/1241* (2013.01); *C01B 2203/1247* (2013.01); *C01B 2203/1252* (2013.01)

(58) Field of Classification Search
None
See application file for complete search history.

(56) References Cited

U.S. PATENT DOCUMENTS

| | | | |
|---|---|---|---|
| 5,650,132 A | 7/1997 | Murata et al. | |
| 6,689,711 B2 * | 2/2004 | Lefebvre | ........................ 502/185 |
| 2004/0010160 A1 | 1/2004 | Coleman et al. | |
| 2006/0260955 A1 * | 11/2006 | Sasaki et al. | ................... 205/759 |
| 2008/0159938 A1 * | 7/2008 | Mauthner et al. | ............. 423/246 |
| 2009/0211942 A1 | 8/2009 | Cortright et al. | |
| 2011/0136036 A1 | 6/2011 | Miyata et al. | |
| 2011/0229766 A1 | 9/2011 | Ozaki et al. | |
| 2012/0214662 A1 * | 8/2012 | Horiguchi et al. | ................. 502/1 |

FOREIGN PATENT DOCUMENTS

| | | | |
|---|---|---|---|
| CN | 101346302 A | 1/2009 | |
| JP | A-8-165101 | 6/1996 | |
| JP | A-2003-146606 | 5/2003 | |
| JP | A-2004-261771 | 9/2004 | |
| JP | A-2009-521387 | 6/2009 | |
| JP | A-2009-291706 | 12/2009 | |
| JP | A-2010-83789 | 4/2010 | |
| JP | A-2010-184906 | 8/2010 | |
| JP | B2-5193274 | 5/2013 | |
| WO | WO 2007/075476 A2 | 7/2007 | |
| WO | WO 2010/064556 A1 | 6/2010 | |
| WO | WO2011/055604 * | 5/2011 | ................ C02F 1/72 |

OTHER PUBLICATIONS

"The role of nanostructure in nitrogen-containing carbon catalysts for the oxygen reduction reaction" Journal of Catalysis, vol. 239 (2006), p. 83-96 Matter et al.*

(Continued)

*Primary Examiner* — Melvin C Mayes
*Assistant Examiner* — Douglas Call
(74) *Attorney, Agent, or Firm* — Oliff PLC (57) ABSTRACT

Provided are a carbon catalyst for hydrogen production having an excellent catalytic activity, a production method therefor, and a method of producing hydrogen using the catalyst. The carbon catalyst for hydrogen production is a carbon catalyst, which is obtained by carbonizing a raw material including an organic substance and a transition metal, the catalyst being used for hydrogen production by thermal decomposition of a hydrocarbon compound and/or an oxygen-containing organic compound. Further, the carbon catalyst for hydrogen production may be obtained by loading an alkaline earth metal on a carbonized material produced by the carbonization.

6 Claims, 2 Drawing Sheets

(56) References Cited

OTHER PUBLICATIONS

"Development of high performance carbon composite catalyst for oxygen reduction reaction in PEM Proton Exchange Membrane fuel cells" Journal of Power Sources, vol. 183 (2008), p. 34-42 Nallathambi et al.*

English-language translation of Aug. 28, 2012 Office Action issued in Japanese Patent Application No. 2010-265334.

English-language translation of Nov. 20, 2012 Office Action issued in Japanese Patent Application No. 2010-265334.

Jan. 31, 2012 International Search Report issued in International Patent Application No. PCT/JP2011/075188 (with translation).

Jun. 4, 2013 International Preliminary Report on Patentability issued in International Patent Application No. PCT/JP2011/075188 (with translation).

N. Muradov et al., "Catalytic activity of carbons for methane decomposition reaction," *Catalysis Today*, 2005, 225-233.

May 12, 2014 Search Report issued in European Patent Application No. EP 11 84 4573.3.

May 15, 2014 Office Action issued in Chinese Patent Application No. 201180057398.7 w/translation.

* cited by examiner

| SAMPLE | AMOUNT OF PRODUCED HYDROGEN ($\mu$mol) | RATIO OF DECREASE IN CATALYTIC ACTIVITY(%) | AMOUNT OF PRODUCED HYDROGEN PER RATIO OF DECREASE IN CATALYTIC ACTIVITY($\mu$mol/%) |
|---|---|---|---|
| CA(Fe) | 2.40 | 12.5 | 0.192 |
| Fe/BP | 1.36 | 15.9 | 0.086 |

FIG.3

| SAMPLE | HYDROGEN DISSOCIATION ACTIVITY (mmol/g) |
|---|---|
| CA(Fe) | 12.9 |
| CA(Fe)AW | 74.2 |
| CA(Mn) | 31.7 |
| Fe/BP | 5.3 |

CARBON CATALYST FOR HYDROGEN PRODUCTION, METHOD FOR PRODUCING CATALYST, AND METHOD FOR PRODUCING HYDROGEN USING CATALYST

TECHNICAL FIELD

The present invention relates to a carbon catalyst for hydrogen production, a production method thereof, and a method of producing hydrogen using the catalyst, and more particularly, to providing a carbon catalyst for hydrogen production having an excellent catalytic activity.

BACKGROUND ART

Hydrogen has attracted attention as an energy source having a low environmental load because only water is discharged when energy is extracted by its combustion. Therefore, in recent years, a method of producing hydrogen using methane as a raw material has attracted attention. Methane can be obtained from a biomass gas as next-generation energy independent of a fossil fuel.

Decomposition of methane requires a very large amount of energy, and hence a metal catalyst such as nickel or iron is mainly used for a thermal decomposition reaction of methane. However, in the thermal decomposition reaction of methane using the metal catalyst, precipitation of carbon on the metal catalyst occurs with production of hydrogen, resulting in deactivating the metal catalyst.

Therefore, hitherto, there has been proposed production of hydrogen using a carbon catalyst (for example, Patent Literature 1, Patent Literature 2, and Non Patent Literature 1). The carbon catalyst itself is a carbon material, and hence is hardly deactivated even when precipitation of carbon due to decomposition of methane occurs.

CITATION LIST

Patent Literature

[PTL 1] JP 8-165101 A
[PTL 2] JP 2003-146606 A

Non Patent Literature

[NPL 1] N. Muradov et al. Catalysis Today, 102-103, (2005), 225-223

SUMMARY OF INVENTION

Technical Problem

However, conventional carbon catalysts have insufficient activities. In addition, it is difficult to stably maintain the activities of the conventional carbon catalysts.

The present invention has been made in view of the above-mentioned problems, and an object of the present invention is to provide a carbon catalyst for hydrogen production having an excellent catalytic activity, a production method thereof, and a method of producing hydrogen using the catalyst.

Solution to Problems

In order to solve the above-mentioned problem, there is provided a carbon catalyst for hydrogen production according to an exemplary embodiment of the present invention, which is obtained by carbonizing a raw material including an organic substance and a transition metal, the catalyst being used for hydrogen production by thermal decomposition of a hydrocarbon compound and/or an oxygen-containing organic compound. According to the present invention, a carbon catalyst for hydrogen production having an excellent catalytic activity is provided.

Further, the carbon catalyst for hydrogen production may be obtained by loading an alkaline earth metal on a carbonized material produced by the carbonization. Further, the carbon catalyst for hydrogen production may have a hydrogen dissociation activity of 10 mmol/g or more, which is calculated, in a hydrogen-deuterium exchange reaction using a reaction tube filled with a predetermined weight of the carbon catalyst for hydrogen production, by dividing a total decrease in hydrogen gas by the predetermined weight when the reaction tube is heated from 40° C. to 600° C. at a temperature increase rate of 10° C./min in a mixed gas including the hydrogen gas, deuterium gas, and argon gas (hydrogen flow rate=10 mL/min, deuterium flow rate=10 mL/min, argon flow rate=30 mL/min).

In order to solve the above-mentioned problem, there is provided a method of producing a carbon catalyst for hydrogen production according to an exemplary embodiment of the present invention, the method including: carbonizing a raw material including an organic substance and a transition metal; and loading an alkaline earth metal on a carbonized material produced by the carbonization. According to the present invention, a method of producing a carbon catalyst for hydrogen production having an excellent catalytic activity is provided.

In order to solve the above-mentioned problem, there is provided a method according to an exemplary embodiment of the present invention, the method including producing hydrogen by thermally decomposing a hydrocarbon compound and/or an oxygen-containing organic compound using any one of the above-mentioned carbon catalysts for hydrogen production. According to the present invention, a method of effectively producing hydrogen using a carbon catalyst for hydrogen production having an excellent catalytic activity is provided.

Advantageous Effects of Invention

According to the present invention, a carbon catalyst for hydrogen production having an excellent catalytic activity, a production method thereof, and a method of producing hydrogen using the catalyst are provided.

DESCRIPTION OF EMBODIMENTS

Hereinafter, one embodiment of the present invention will be described. It should be noted that the present invention is not limited to examples shown in this embodiment.

A carbon catalyst for hydrogen production according to this embodiment (hereinafter referred to as "catalyst of the present invention") is a carbon catalyst which is obtained by carbonizing a raw material including an organic substance and a transition metal and is used for hydrogen production by thermal decomposition of a hydrocarbon compound and/or an oxygen-containing organic compound.

The organic substance used for the raw material for the catalyst of the present invention is not particularly limited as long as the organic substance is carbonized, and any one or more kinds of organic substances may be used. For example, an organic substance containing a nitrogen atom may be used as the organic substance. For example, an organic compound containing a nitrogen atom may be used as the organic substance containing a nitrogen atom. The organic compound containing a nitrogen atom is not particularly limited as long as the compound contains a nitrogen atom in its molecule. For example, one or both of a high-molecular-weight organic compound (for example, a resin such as a thermosetting resin or a thermoplastic resin) and a low-molecular-weight organic compound containing a nitrogen atom may be used. In addition, a biomass may also be used.

For example, a ligand capable of coordinating to a metal may be preferably used as the organic compound. That is, in this case, an organic compound containing one or more ligand atoms in its molecule is used. More specifically, for example, an organic compound containing, as the ligand atom, one or more kinds selected from the group consisting of a nitrogen atom, a phosphorus atom, an oxygen atom, and a sulfur atom may be used. In addition, for example, an organic compound containing, as a coordinating group, one or more kinds selected from the group consisting of an amino group, a phosphino group, a carboxyl group, and a thiol group in its molecule may be used. For example, the organic substance may contain one or more kinds selected from the group consisting of a boron atom, a phosphorous atom, an oxygen atom, and a sulfur atom as a component for improving the activity of the catalyst of the present invention.

As the organic substance, specifically, for example, one or more kinds selected from the group consisting of a phenol resin, polyfurfuryl alcohol, furan, a furan resin, a phenol formaldehyde resin, melamine, a melamine resin, an epoxy resin, a chelate resin, a polyamide-imide resin, pyrrole, polypyrrole, polyvinylpyrrole, 3-methylpolypyrrole, acrylonitrile, polyacrylonitrile, a polyacrylonitrile-polymethacrylic acid copolymer, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic acid dihydrazide, adipic acid dihydrazide, polysulfone, polyaminobismaleimide, polyimide, polyvinyl alcohol, polyvinylbutyral, benzimidazole, polybenzimidazole, polyamide, polyester, polylactic acid, polyether, polyether ether ketone, cellulose, carboxymethylcellulose, lignin, chitin, chitosan, pitch, brown coal, silk, wool, polyamino acid, a nucleic acid, DNA, RNA, hydrazine, hydrazide, urea, salen, polycarbazole, polybismaleimide, triazine, polyacrylic acid, polyacrylic acid ester, polymethacrylic acid ester, polymethacrylic acid, polyurethane, polyamideamine, and polycarbodiimide may be used.

The transition metal is not particularly limited as long as the transition metal does not inhibit the activity of the catalyst of the present invention. Any one or more kinds of transition metals (Group 3 to Group 12 of the periodic table) may be used, and transition metals belonging to the fourth period of Group 3 to Group 12 of the periodic table may be preferably used.

Specifically, as the other metal, for example, one or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), ruthenium (Ru), rhodium (Rh), palladium (Pd), lanthanoid series elements (such as cerium (Ce)), and actinoid series elements may be preferably used.

The transition metal may be used as an elementary substance of the transition metal or a compound of the metal. As the metal compound, for example, a metal salt, a metal oxide, a metal hydroxide, a metal nitride, a metal sulfide, a metal carbide, or a metal complex may be used. Of those, a metal salt, a metal oxide, a metal sulfide, or a metal complex is preferably used. It should be noted that, when a ligand is used as the organic compound, a metal complex is formed in the raw material.

The total amount of the transition metals to the amount of the raw material is not particularly limited as long as the catalyst of the present invention has a desired characteristic. For example, the amount may be 0.1 to 50% by mass, 0.5 to 30% by mass, or 1 to 20% by mass.

The raw material may further contain another component. That is, the raw material may contain a carbon material, for example. The carbon material is not particularly limited, and any one or more kinds of materials may be used. That is, for example, a carbon material having no catalytic activity in itself may be used as the carbon material.

Specifically, for example, one or more kinds selected from the group consisting of carbon black, a carbon nanotube, a carbon nanohorn, a carbon fiber, a carbon fibril, graphite powder, activated carbon, glassy carbon, mesoporous carbon, carbon fiber, fullerene, onion-like carbon, graphene, charcoal, coal char, and biomass char may be used.

In the production of the catalyst of the present invention, first, the above-mentioned raw material including an organic substance and a transition metal is mixed. A method of mixing the raw material is not particularly limited, and for example, a mortar or a stirring device may be used. In addition, one or more kinds of mixing methods such as powder mixing for mixing the organic substance and the transition metal in powder forms, and solvent mixing for mixing the raw material after addition of a solvent may be used.

Then, the catalyst of the present invention is obtained by carbonizing the raw material prepared as described above. In the carbonization, the raw material is heated and maintained at such a predetermined temperature that the raw material is carbonized (carbonization temperature).

The carbonization temperature is not particularly limited as long as the raw material is carbonized. For example, the carbonization temperature may be 300° C. or more. More specifically, the carbonization temperature may be, for example, 300° C. or more and 1,500° C. or less, preferably 400° C. or more and 1,200° C. or less, more preferably 500° C. or more and 1,100° C. or less.

The temperature increase rate in heating of the raw material to a carbonization temperature is not particularly limited. For example, the temperature increase rate may be 0.5° C./min or more and 300° C./min or less. The time for maintaining the raw material at the carbonization temperature (carbonization time) is not particularly limited as long as the raw material is carbonized, and the time may be 5 minutes or more, for example. More specifically, the carbonization time may be, for example, 5 minutes or more and 240 minutes or less, preferably 20 minutes or more and 180 minutes or less. In addition, carbonization is preferably carried out in an inert gas such as nitrogen (for example, in an inert gas flow).

In such a production method, a carbonized material produced by carbonization of the raw material may be obtained as the catalyst of the present invention without any further treatment. In addition, the catalyst of the present invention may be a carbon catalyst in a fine particle form obtained by pulverizing the carbonized material. A method of pulverizing the carbonized material is not particularly limited, and for example, a pulverization device such as a ball mill or a bead mill may be used. The average particle size of the pulverized carbonized material may be, for example, 150 μm or less, preferably 100 μm or less.

In addition, the catalyst of the present invention may be a carbon catalyst obtained by loading an alkaline earth metal on a carbonized material produced by carbonization. That is, the catalyst of the present invention is produced by carbonizing a raw material including an organic substance and a transition metal and loading an alkaline earth metal on a carbonized material produced by the carbonization.

In this case, the catalyst of the present invention includes the alkaline earth metal loaded after carbonization. The alkaline earth metal is loaded mainly on the surface of the catalyst of the present invention. When the alkaline earth metal is loaded, the activity of the catalyst of the present invention is improved effectively compared to a case where no alkaline earth metal is loaded. It should be noted that the inventors of the present invention have made intensive studies, and as a result, have paid attention to hydrogen dissociation activities of carbon catalysts as shown in Examples below, and have uniquely found that the catalytic activities are improved by loading the alkaline earth metal.

A method of loading the alkaline earth metal on the carbonized material is not particularly limited, and the catalyst of the present invention formed of the carbonized material loaded with the alkaline earth metal is obtained by, for example, mixing a powdery carbonized material and a powdery alkaline earth metal. In the mixing, a mortar or a stirring device may be used. In addition, the catalyst of the present invention may be obtained by employing, for example, an impregnation loading method, an ion exchange loading method, a sol-gel method, or a co-precipitation method to load the alkaline earth metal on the carbonized material.

The alkaline earth metal is not particularly limited. One or more kinds selected from the group consisting of beryllium (Be), magnesium (Mg), calcium (Ca), strontium (Sr), and barium (Ba), and there may be preferably used one or more kinds selected from the group consisting of magnesium (Mg), calcium (Ca), and barium (Ba) may be used.

The amount of the alkaline earth metal loaded in the catalyst of the present invention is not particularly limited as long as the alkaline earth metal improves the activity of the catalyst of the present invention. That is, the amount of the alkaline earth metal in the catalyst of the present invention may be, for example, 0.1 to 50 wt % (0.1 to 50 parts by weight of the alkaline earth metal with respect to 100 parts by weight of the carbonized material), preferably 0.5 to 30 wt %, more preferably 1 to 20 wt % with respect to the carbonized material loaded with the alkaline earth metal.

In addition, the catalyst of the present invention may be a carbon catalyst obtained by subjecting the carbonized material produced by carbonization to an additional treatment. That is, the catalyst of the present invention may be, for example, a carbon catalyst obtained by subjecting the carbonized material to a metal-removing treatment. Further, in this case, the catalyst of the present invention may be, for example, a carbon catalyst obtained by loading the alkaline earth metal on a carbonized material subjected to the metal-removing treatment. When the carbonized material is subjected to the metal-removing treatment, the transition metal is removed from the carbonized material to expose an active site of the carbon structure.

The metal-removing treatment is a treatment for removing a transition metal in the carbonized material. The metal-removing treatment is not particularly limited as long as the transition metal in the carbonized material is removed or the amount of the transition metal is reduced. For example, a washing treatment with an acid or an electrolytic treatment may be carried out.

The acid to be used for the washing treatment with an acid is not particularly limited as long as an effect of the metal-removing treatment is obtained, and any one or more kinds of acid may be used. That is, for example, one or more kinds selected from the group consisting of hydrochloric acid (for example, concentrated hydrochloric acid), nitric acid (for example, concentrated nitric acid), and sulfuric acid (for example, concentrated sulfuric acid) may be used. In a case of using two or more kinds of acid, for example, a mixed acid prepared by mixing concentrated hydrochloric acid and concentrated nitric acid at a predetermined volume ratio (for example, aqua regia) or a mixed acid prepared by mixing concentrated nitric acid and concentrated sulfuric acid at a predetermined volume ratio may be used. A method for the washing treatment with an acid is not particularly limited, and for example, a method involving immersing a carbonized material in a solution containing an acid and maintaining the material may be employed.

It should be noted that in a case where the catalyst of the present invention is obtained through the metal-removing treatment, the catalyst of the present invention may be substantially free of the transition metal or may contain a remaining transition metal. The transition metal remaining in the catalyst of the present invention is identified by a method such as elemental analysis.

In addition, the catalyst of the present invention may be a carbon catalyst obtained by doping nitrogen atoms or boron atoms into the carbonized material produced by carbonizing the raw material. In this case, in the production of the catalyst of the present invention, nitrogen atoms or boron atoms may be doped into the carbonized material at any step. As a method of doping nitrogen atoms or boron atoms, for example, a gas-phase doping method such as an ammoxidation method or a CVD method, a liquid-phase doping method, or a gas-phase-liquid-phase doping method may be employed. Specifically, for example, a nitrogen source such as ammonia, melamine, or acetonitrile, or a boron source such as boric acid or sodium borohydride is mixed with the carbonized material, and the resultant mixture may be maintained in an inert gas (such as nitrogen, argon, or helium) atmosphere at a temperature of 550° C. or more and 1,200° C. or less for a time of 5 minutes or more and 180 minutes or less, to thereby dope the nitrogen atom into the surface of the carbonized material.

In addition, the catalyst of the present invention may be a carbon catalyst obtained by subjecting the carbonized material produced by carbonizing the raw material to an activation treatment such as carbon dioxide activation, phosphoric acid activation, alkali activation, hydrogen activation, ammonia activation, nitric oxide activation, or electric activation and/or a liquid-phase oxidation such as nitric acid oxidation, mixed acid oxidation, or hydrogen peroxide oxidation.

The catalyst of the present invention has a specific surface area of, for example, 10 $m^2/g$ or more, preferably 100 $m^2/g$ or more, which is determined by a nitrogen adsorption BET method. More specifically, the catalyst of the present invention has a specific surface area of, for example, 200 $m^2/g$ or more and 3,000 $m^2/g$ or less, preferably 300 $m^2/g$ or more and 3,000 $m^2/g$ or less.

In addition, the catalyst of the present invention is used for hydrogen production by thermal decomposition of a hydrocarbon compound and/or an oxygen-containing organic compound. That is, the catalyst of the present invention has an activity to catalyze a reaction for producing hydrogen by thermally decomposing the hydrocarbon compound and/or the oxygen-containing organic compound.

In connection with the catalytic activity, the catalyst of the present invention has a predetermined hydrogen dissociation activity. That is, the catalyst of the present invention may have a hydrogen dissociation activity of 10 mmol/g or more, which is calculated, in a hydrogen-deuterium exchange reaction using a reaction tube filled with a predetermined weight (for example, 20 mg) of the catalyst of the present invention, by dividing a total decrease in hydrogen gas by the predetermined weight when the reaction tube is heated from 40° C. to 600° C. at a temperature increase rate of 10° C./min in a mixed gas including the hydrogen gas, deuterium gas, and argon gas (hydrogen flow rate=10 mL/min, deuterium flow rate=10 mL/min, argon flow rate=30 mL/min).

In addition, the method according to this embodiment (hereinafter referred to as "method of the present invention") is a method of producing hydrogen by thermally decomposing a hydrocarbon compound and/or an oxygen-containing organic compound using the catalyst of the present invention.

The hydrocarbon compound and the oxygen-containing organic compound are not particularly limited as long as the compounds are thermally decomposed to produce hydrogen. That is, as the hydrocarbon compound, one or more kinds selected from the group consisting of an aliphatic hydrocarbon, an alicyclic hydrocarbon, and an aromatic hydrocarbon may be used.

As the aliphatic hydrocarbon, for example, one having 1 to 20 carbon atoms may be preferably used, and one having 1 to 12 carbon atoms may be particularly preferably used. Specifically, one or more kinds selected from the group consisting of methane, ethane, ethylene, propane, propylene, and butane may be used. As the alicyclic hydrocarbon, for example, one having 3 to 12 carbon atoms may be preferably used. Specifically, for example, one or more kinds selected from the group consisting of cyclopropane, cyclobutane, cyclopentane, and cyclohexane may be used. As the aromatic hydrocarbon, for example, one having 5 to 16 carbon atoms may be preferably used. Specifically, for example, one or more kinds selected from the group consisting of benzene, toluene, xylene, ethylbenzene, and tetralin may be used.

As the oxygen-containing organic compound, for example, one or more kinds selected from the group consisting of alcohols, ethers, esters, and ketones may be used. As the alcohols, for example, one having 1 to 12 carbon atoms may be preferably used. Specifically, for example, one or more kinds selected from the group consisting of methanol, ethanol, propanol, and butanol may be used. As the ethers, for example, one having 2 to 12 carbon atoms may be preferably used. Specifically, for example, one or more kinds selected from the group consisting of dimethyl ether, ethyl methyl ether, diethyl ether, oxacyclopentane, and crown ethers may be used. As the esters, for example, one having 2 to 12 carbon atoms may be preferably used. Specifically, for example, one or more kinds selected from the group consisting of methyl formate, methyl acetate, ethyl acetate, propyl acetate, methyl propionate, methyl butyrate, ethyl butyrate, methyl acrylate, ethyl acrylate, butyl acrylate, methyl methacrylate, and butyl methacrylate may be used. As the ketones, for example, one having 3 to 6 carbon atoms may be preferably used. Specifically, for example, one or more kinds selected from the group consisting of propanone, pentanone, butanone, and cyclohexanone may be used.

In the method of the present invention, the hydrocarbon compound and/or the oxygen-containing organic compound is thermally decomposed in the presence of the catalyst of the present invention to produce hydrogen. That is, in the method of the present invention, the hydrocarbon compound and/or the oxygen-containing organic compound is brought into contact with the catalyst of the present invention with heating. As the hydrocarbon compound and/or the oxygen-containing organic compound, a gaseous or liquid hydrocarbon compound and/or oxygen-containing organic compound may be preferably used, and a gaseous hydrocarbon compound and/or oxygen-containing organic compound may be particularly preferably used.

A mixture including the hydrocarbon compound and/or the oxygen-containing organic compound and another component may be brought into contact with the catalyst of the present invention. That is, in the case of using the gaseous hydrocarbon compound and/or oxygen-containing organic compound, for example, a mixed gas including the hydrocarbon compound and/or the oxygen-containing organic compound and an inert gas such as argon, nitrogen, or helium may be brought into contact with the catalyst of the present invention. In addition, a biomass gas including the hydrocarbon compound and/or the oxygen-containing organic compound may be brought into contact with the catalyst of the present invention. The biomass gas may contain, for example, another component such as water or carbon dioxide. In addition, a thermally decomposed organic gas obtained by thermally decomposing a synthetic resin (polyethylene, polystyrene, polyester, a thermosetting resin, a phenol resin, an epoxy resin, a Bakelite resin, or polycarbonate) or an organic substance such as petroleum, kerosene, or heavy oil may be brought into contact with the catalyst of the present invention.

The temperature at which the catalyst of the present invention is brought into contact with the hydrocarbon compound and/or the oxygen-containing organic compound is not particularly limited as long as the hydrocarbon compound and/or the oxygen-containing organic compound is thermally decomposed to produce hydrogen, and the temperature may be, for example, 300° C. or more, preferably 500° C. or more. More specifically, the temperature may be, for example, 300 to 1,100° C., preferably 500 to 1,000° C., more preferably 600 to 1,000° C.

Hereinafter, specific examples according to this embodiment will be described.

EXAMPLES

Example 1

(Carbon Catalyst CA(Fe))

0.4 g of polyvinylpyridine, 0.45 g of iron(III) chloride hexahydrate, and 0.5 g of ketjen black (ECP600JD, manufactured by Lion Corporation) were placed in a mortar and mixed homogeneously to prepare a raw material. The resultant raw material was placed in a horizontal image furnace, heated in a nitrogen atmosphere at a temperature increase rate of 50° C./min, and maintained at a carbonization temperature of 900° C. for 1 hour to carbonize the raw material. The carbonized material produced by carbonization was obtained as a carbon catalyst CA(Fe). The carbon catalyst CA(Fe) had a BET specific surface area of 630 $m^2/g$.

(Carbon Catalyst CA(Fe)AW)

The carbon catalyst CA(Fe) was subjected to a metal-removing treatment by washing with an acid. That is, 100 mL of concentrated hydrochloric acid were added to 1 g of the carbon catalyst CA(Fe), and the mixture was stirred for 1 hour. The carbon catalyst was precipitated, and the solution was removed. After that, 100 mL of a solution obtained by mixing concentrated hydrochloric acid and distilled water at 1:1 (by volume) was added, and the mixture was stirred for 1 hour. The carbon catalyst was precipitated, and the solution was removed. After that, 100 mL of distilled water was added, and the mixture was stirred for 1 hour. The solution containing the carbon catalyst was filtered using a filter membrane (pore size: 1.0 µm, manufactured by Millipore Corporation), and the residue was washed with distilled water until the filtrate became neutral. The collected carbon catalyst was dried under vacuum at 60° C. for 12 hours. Thus, a carbon catalyst CA(Fe)AW subjected to the metal-removing treatment was obtained. The carbon catalyst CA(Fe)AW had a BET specific surface area of 690 $m^2/g$.

(Carbon Catalyst CA(Co))

A carbon catalyst CA(Co) was obtained in the same manner as in the case of the above-mentioned carbon catalyst CA(Fe) except that cobalt chloride hexahydrate was used instead of iron (III) chloride hexahydrate. The carbon catalyst CA(Co) had a BET specific surface area of 670 $m^2/g$.

(Carbon catalyst CA(Ni))

A carbon catalyst CA(Ni) was obtained in the same manner as in the case of the above-mentioned carbon catalyst CA(Fe) except that nickel chloride hexahydrate was used instead of iron (III) chloride hexahydrate. The carbon catalyst CA(Ni) had a BET specific surface area of 650 $m^2/g$.

(Carbon Catalyst CA(Mn))

1.5 g of a polyacrylonitrile-polymethacrylic acid copolymer were dissolved in 30 g of dimethylformamide. After that, 1.25 g of manganese chloride tetrahydrate and 1.5 g of 2-methylimidazole were added thereto, and the mixture was stirred for 2 hours to obtain a solution. To the resultant solution was added ketjen black (ECP600JD, manufactured by Lion Corporation) so that the content of the ketjen black in a precursor composition described below was 67 wt %, and the resultant was mixed using a mortar. Further, the mixture was dried under reduced pressure at 60° C. and 6.4×10$^{-2}$ Pa for 12 hours to remove dimethylformamide. Thus, the precursor composition was obtained.

Next, the precursor composition was subjected to an infusibilizing treatment. That is, the precursor composition was set in a forced-circulation drying machine. Thereafter, the temperature in the drying machine was raised in air from room temperature to 150° C. over 30 minutes, and subsequently raised from 150° C. to 220° C. over 2 hours. After that, the precursor composition was maintained at 220° C. for 3 hours. Thus, the precursor composition was infusibilized, to thereby obtain a raw material for carbonization.

Thereafter, the raw material was carbonized. That is, the raw material obtained as described above was placed in a quartz tube, and nitrogen purge in the quartz tube was carried out for 20 minutes in an ellipsoidal reflection type infrared gold image furnace. Subsequently, heating was started, and the temperature in the gold image furnace was raised from room temperature to 900° C. at a temperature increase rate of 50° C./min. After that, the quartz tube was maintained at 900° C. for 1 hour. Thus, a carbonized material produced by carbonizing the raw material was obtained.

Further, the carbonized material was subjected to a pulverization treatment. That is, a silicon nitride ball having a diameter of 10 mm was set in a planetary ball mill (P-7, manufactured by Fritsch Japan Co., Ltd.), and the carbonized material was pulverized at a rotation rate of 650 rpm for 50 minutes. The pulverized carbonized material was taken out and was classified with a 106 µm-mesh sieve. The carbonized material that passed through the sieve was obtained as a carbon catalyst CA(Mn). The carbon catalyst CA(Mn) had a BET specific surface area of 900 $m^2/g$.

(Comparative Sample KB)

Commercially available ketjen black (ECP600JD, manufactured by Lion Corporation) used for the raw material for the carbon catalyst as well was used as a comparative sample KB. The comparative sample KB had a BET specific surface area of 1,200 $m^2/g$.

(Comparative Sample BP)

Commercially available carbon black (Black Pearls 2000, manufactured by CABOT Corporation) was used as a comparative sample BP. The comparative sample BP had a BET specific surface area of 1,500 $m^2/g$.

(Comparative Sample Fe/BP)

A comparative sample Fe/BP was prepared by loading iron on the comparative sample BP. That is, first, about 0.1 g of iron (III) nitrate nonahydrate was placed in a recovery flask and dissolved in 100 mL of distilled water. Subsequently, the comparative sample BP was added to the aqueous solution of iron nitrate. Further, about 5 mL of methanol were added thereto, and the mixture was ultrasonically stirred for 10 minutes. After the stirring, the recovery flask was attached to an evaporator, rotated under reduced pressure for 20 minutes, and immersed in a hot-water bath at 60° C. to dry the mixture under reduced pressure.

Thus, a comparative sample Fe/BP loaded with iron at 10 wt % with respect to the comparative sample BP was obtained. The comparative sample Fe/BP had a BET specific surface area of 1,365 $m^2/g$.

(Hydrogen Production by Thermal Decomposition of Methane)

Hydrogen production by thermal decomposition of methane was carried out using methane as the hydrocarbon compound in the presence of any one of the above-mentioned carbon catalysts and comparative samples. That is, a quartz-made reaction tube having an inner diameter of 1 cm was filled with 30 mg of the carbon catalyst or comparative sample. Subsequently, the reaction tube was set in a vertical image furnace, and a pretreatment was carried out by heating the reaction tube in an argon atmosphere at a temperature increase rate of 10° C./min and maintaining the reaction tube at 700° C. for 1 hour. It should be noted that in the case of using the comparative sample Fe/BP, instead of the pretreatment, a pretreatment (reduction treatment) was carried out by heating the reaction tube in a hydrogen atmosphere at a temperature increase rate of 50° C./min and maintaining the reaction tube at 350° C. for 1 hour.

Thereafter, the reaction tube was sufficiently cooled, and a mixed gas including methane and argon (methane flow rate=23 mL/min, argon flow rate=27 mL/min) was allowed to flow for 30 minutes to stabilize the concentration of the gas in the apparatus. After that, the reaction tube was heated from room temperature to 900° C. at a temperature increase rate of 10° C./min to carry out thermal decomposition reaction of methane. After the temperature reached 900° C., the reaction tube was maintained at 900° C. for 20 minutes while the mixed gas was continuously allowed to flow.

Respective temperatures in the temperature-raising process and analyses of gas components after the temperature reached 900° C. were carried out by a high-speed and compact gas analyzer (Micro GC 490-GC, manufactured by VARIAN). Thereafter, based on analysis results in the temperature-raising process, hydrogen production rates per specific surface area ($\mu$mol/(min·m$^2$)) at the respective temperatures were calculated.

(Hydrogen-Deuterium Exchange Reaction)

As one of the characteristics of the carbon catalysts and the comparative samples, the catalytic activity of dissociating a hydrogen molecule into hydrogen atoms was evaluated based on a hydrogen ($H_2$)-deuterium ($D_2$) exchange reaction. That is, the amount of hydrogen gas dissociated by bringing a mixed gas including hydrogen gas ($H_2$) and deuterium gas ($D_2$) into contact with the carbon catalyst or comparative sample was evaluated by a temperature programmed reaction (TPR) method.

Specifically, first, a blank value was measured. That is, a quartz reaction tube filled with no carbon catalyst and no comparative sample was set in a catalyst analysis apparatus (manufactured by BEL Japan. Inc.), and argon gas was allowed to flow at a flow rate of 50 mL/min for 30 minutes to replace the gas phase in the system with argon. Further, a pretreatment was carried out by heating the reaction tube in an argon atmosphere at a temperature increase rate of 50° C./min and maintaining the reaction tube at 700° C. for 1 hour.

Thereafter, the reaction tube was naturally cooled to 40° C., and then a mixed gas including hydrogen gas, deuterium gas, and argon gas (hydrogen flow rate=10 mL/min, deuterium flow rate=10 mL/min, argon flow rate=30 mL/min) was allowed to flow for 10 minutes. After that, the reaction tube was heated to 900° C. at a temperature increase rate of 10° C./min while the mixed gas was allowed to flow.

Concentrations of the hydrogen gas in the temperature-raising process were analyzed by a quadrupole mass spectrometer (Q-mass) to determine decreases in the hydrogen gas at the respective temperatures.

Next, the analysis was carried out in the same way as described above using the carbon catalysts and comparative samples. That is, first, 20 mg of any one of the carbon catalyst CA(Fe), carbon catalyst CA(Fe)AW, carbon catalyst CA(Mn), and comparative sample Fe/BP was weighed, and the quartz reaction tube was filled with the sample. In this process, quartz wool was put in the upper and lower portions of the sample to prevent scattering of the sample during the reaction.

After that, the reaction tube was set in a commercially available catalyst analysis apparatus (manufactured by BEL Japan, Inc.), and argon gas was allowed to flow at a flow rate of 50 mL/min for 30 minutes to replace the gas phase in the system with argon. Further, a pretreatment was carried out by heating the reaction tube in an argon atmosphere at a temperature increase rate of 50° C./min and maintaining the reaction tube at 700° C. for 1 hour.

Thereafter, the reaction tube was naturally cooled to 40° C., and then a mixed gas including hydrogen gas, deuterium gas, and argon gas (hydrogen flow rate=10 mL/min, deuterium flow rate=10 mL/min, argon flow rate=30 mL/min) was allowed to flow for 10 minutes. After that, the reaction tube was heated to 900° C. at a temperature increase rate of 10° C./min while the mixed gas was allowed to flow.

Concentrations of the hydrogen gas in the temperature-raising process were analyzed by the quadrupole mass spectrometer (Q-mass) to determine decreases in the hydrogen gas at the respective temperatures. Thereafter, at each temperature, a value obtained by subtracting a decrease in the hydrogen gas determined by the blank value measurement from a decrease in the hydrogen gas determined using the sample was calculated as a decrease in the hydrogen gas determined actually using the sample.

Further, the calculated decreases in the hydrogen gas were plotted against temperatures to create a curve showing a correlation between the decreases in the hydrogen gas and the temperatures. From the created curve, a total decrease in the hydrogen gas at from 40° C. to 600° C. was calculated. Thereafter, a value obtained by dividing the total decrease in the hydrogen gas thus calculated by the weight (20 mg) of the used carbon catalyst or comparative sample was evaluated as a hydrogen dissociation activity (mmol/g) per weight of the carbon catalyst or comparative sample.

(Evaluation Results)

Figure 1:
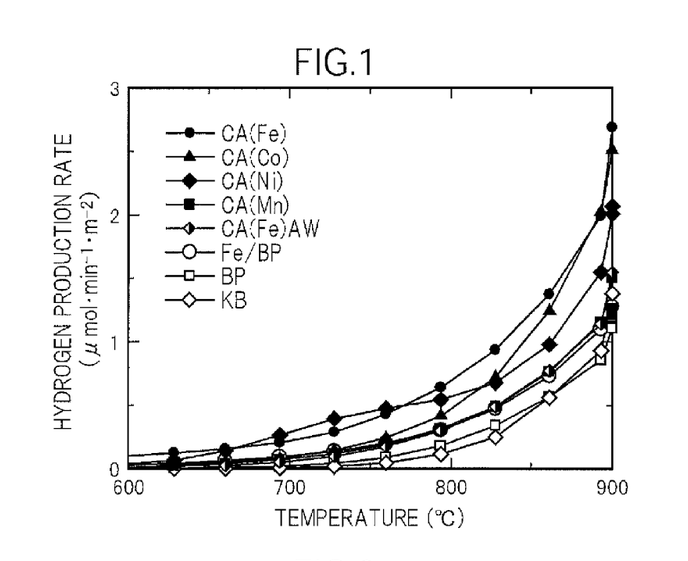
FIG. 1 An explanatory diagram showing examples of evaluation results of hydrogen production rates of carbon catalysts in Examples according to one embodiment of the present invention.

FIG. 1 shows the evaluation results of the hydrogen production rates in hydrogen production by thermal decomposition of methane using any one of the carbon catalysts and comparative samples. In FIG. 1, the horizontal axis represents the temperatures (° C.) at which thermal decomposition of methane was carried out, and the vertical axis represents the hydrogen production rates per specific surface area ($\mu$mol/(min·m$^2$)) of the carbon catalyst or comparative sample at the respective temperatures.

In FIG. 1, the filled circles represent the results of use of the carbon catalyst CA(Fe), the filled triangles represent the results of use of the carbon catalyst CA(Co), the filled diamonds represent the results of use of the carbon catalyst CA(Ni), the filled squares represent the results of use of the carbon catalyst CA(Mn), the half-filled diamonds represent the results of use of the carbon catalyst CA(Fe)AW, the open circles represent the results of use of the comparative sample Fe/BP, the open squares represent the results of use of the comparative sample BP, and the open diamonds represent the results of use of the comparative sample KB.

As shown in FIG. 1, the hydrogen production rates at least at 600 to 900° C. in the presence of the carbon catalysts are almost equal to or more than those in the presence of the comparative samples, and in particular, the hydrogen production rates in the cases of using the carbon catalyst CA(Fe), carbon catalyst CA(Co), and carbon catalyst CA(Ni) are significantly large.

Figure 2:
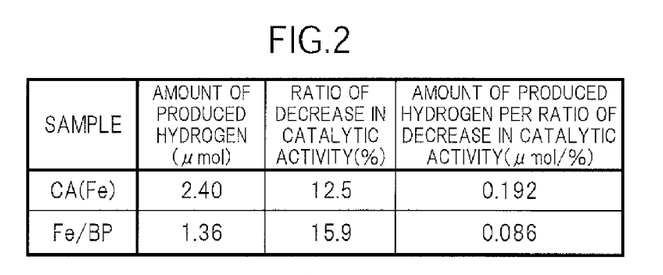
FIG. 2 An explanatory diagram showing examples of evaluation results of amounts of produced hydrogen and ratios of decrease in catalytic activities of carbon catalysts in Examples according to one embodiment of the present invention.

FIG. 2 shows the evaluation results of the amount of produced hydrogen ($\mu$mol), the rate of decrease in the catalytic activity (%), and the amount of produced hydrogen ($\mu$mol/%) per rate of decrease in the catalytic activity, determined when the reaction temperature was maintained to 900° C. for 20 minutes in the case of using any one of the carbon catalyst CA(Fe) and comparative sample Fe/BP.

The amount of produced hydrogen was calculated as an amount of hydrogen gas produced during a period between a time point when the temperature reached 900° C. and a time point when 20 minutes elapsed after maintaining the temperature at 900° C. The rate of decrease in the catalytic activity was calculated from a difference between the hydrogen production rate at the time point when the temperature reached 900° C. and the hydrogen production rate at the time point when 20 minutes elapsed after maintaining the temperature at 900° C. based on the hydrogen production rate of the former defined as 100%.

Further, the amount of produced hydrogen per rate of decrease in the catalytic activity was calculated by dividing the amount of produced hydrogen calculated as described above by the rate of decrease in the catalytic activity. The amount of produced hydrogen per rate of decrease in the catalytic activity represents the amount of hydrogen produced until the catalytic activity decreases by 1%. Therefore, as the amount of produced hydrogen per rate of decrease in the catalytic activity becomes larger, the amount of produced hydrogen until the catalytic activity of the carbon catalyst or comparative sample decreases by a predetermined percentage, that is, the amount of produced hydrogen until the carbon catalyst or comparative sample is deactivated becomes larger.

As shown in FIG. 2, the amount of produced hydrogen in the case of using the carbon catalyst CA(Fe) is significantly larger than that in the case of using the comparative sample Fe/BP. On the other hand, the rate of decrease in the catalytic activity of the carbon catalyst CA(Fe) is smaller than that of the comparative sample Fe/BP. That is, the catalytic activity of the carbon catalyst CA(Fe) hardly decreases compared to that of the comparative sample Fe/BP. In addition, the amount of produced hydrogen per rate of decrease in the catalytic activity of the carbon catalyst CA(Fe) is significantly larger than that of the comparative sample Fe/BP.

As mentioned above, the catalytic activity of the carbon catalyst CA(Fe) was found to be higher than that of the comparative sample Fe/BP and to be maintained effectively in the hydrogen production reaction at a relatively high temperature.

Figure 3:
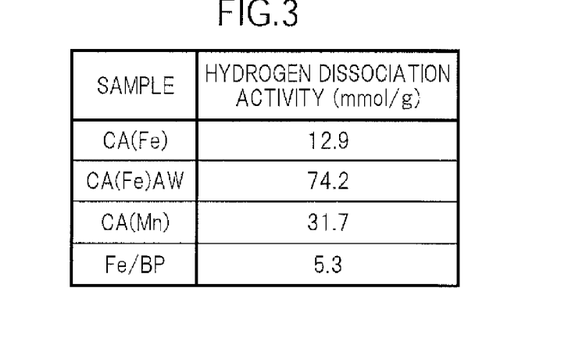
FIG. 3 An explanatory diagram showing examples of evaluation results of hydrogen dissociation activities of carbon catalysts in Examples according to one embodiment of the present invention.

FIG. 3 shows the evaluation results of the hydrogen dissociation activity (mmol/g) in the hydrogen-deuterium exchange reaction using any one of the carbon catalyst CA(Fe), carbon catalyst CA(Fe)AW, carbon catalyst CA(Mn), and comparative sample Fe/BP.

As shown in FIG. 3, the hydrogen dissociation activities of all the three kinds of carbon catalyst are higher than the hydrogen dissociation activity of the comparative sample. In addition, it was also found that in the cases of using the carbon catalysts, dissociation of hydrogen was started at a lower temperature compared to the case of using the comparative sample, although the results were not shown in the figure.

That is, the carbon catalysts were found to have high catalytic activities to dissociate hydrogen compared to the comparative sample. Based on the results, the inventors of the present invention have conceived that an alkaline earth metal such as magnesium or calcium suitable for hydrogen storage is loaded on the carbon catalysts as mentioned below.

Example 2

(Carbon Catalyst Mg/CA(Fe))

The carbon catalyst CA(Fe) and magnesium hydroxide were placed in an agate mortar and mixed. Thus, a carbon catalyst Mg/CA(Fe) loaded with 3 wt % of magnesium with respect to the carbon catalyst CA(Fe) (3 parts by weight of magnesium with respect to 100 parts by weight of the carbon catalyst CA(Fe)) was obtained.

(Carbon Catalyst Mg/CA(Fe)AW)

A carbon catalyst Mg/CA(Fe)AW loaded with 3 wt % of magnesium with respect to the carbon catalyst CA(Fe)AW was obtained in the same manner as in the case of the above-mentioned carbon catalyst Mg/CA(Fe) except that the carbon catalyst CA(Fe)AW was used instead of the carbon catalyst CA(Fe).

(Carbon Catalyst Mg/CA(Mn))

A carbon catalyst Mg/CA(Mn) loaded with 3 wt % of magnesium with respect to the carbon catalyst CA(Mn) was obtained in the same manner as in the case of the above-mentioned carbon catalyst Mg/CA(Fe) except that the carbon catalyst CA(Mn) was used instead of the carbon catalyst CA(Fe).

(Carbon Catalyst Ca/CA(Mn))

A carbon catalyst Ca/CA(Mn) loaded with 3 wt % of calcium with respect to the carbon catalyst CA(Mn) was obtained in the same manner as in the case of the above-mentioned carbon catalyst Ca/CA(Mn) except that calcium hydroxide was used instead of magnesium hydroxide.

(Comparative Sample Mg/BP)

A comparative sample Mg/BP loaded with 3 wt % of magnesium with respect to the comparative sample BP was obtained in the same manner as in the case of the above-mentioned carbon catalyst M/CA(Fe) except that the comparative sample BP was used instead of the carbon catalyst CA(Fe).

(Comparative Sample Mg/Fe/BP)

A comparative sample Mg/Fe/BP loaded with 3 wt % of magnesium with respect to the comparative sample Fe/BP was obtained in the same manner as in the case of the above-mentioned comparative sample Mg/BP except that the comparative sample Fe/BP was used instead of the comparative sample BP.

(Hydrogen Production by Thermal Decomposition of Methane)

In the same manner as in Example 1 above, hydrogen production by thermal decomposition of methane was carried out in the presence of any one of the carbon catalysts and comparative samples loaded with the alkaline earth metal. It should be noted that instead of the pretreatment in Example 1 above, a pretreatment (reduction treatment) was carried out by heating the carbon catalyst or comparative sample in a hydrogen atmosphere at a temperature increase rate of 50° C./min and maintaining the catalyst or sample at 650° C. for 1 hour.

(Evaluation Results)

Figure 4:
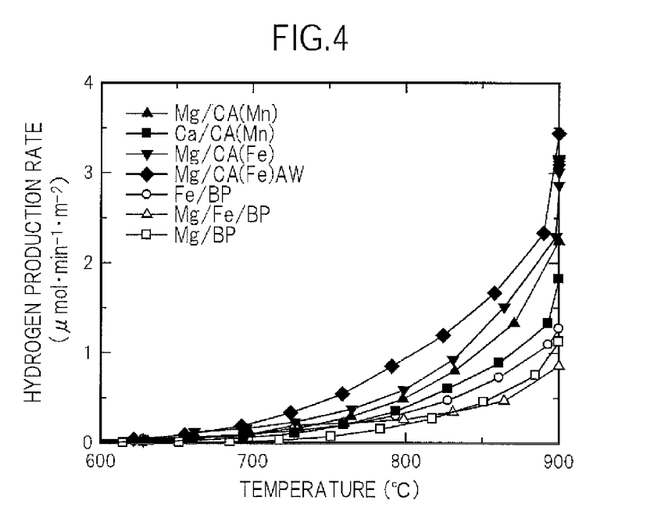
FIG. 4 An explanatory diagram showing other examples of evaluation results of hydrogen production rates of carbon catalysts in Examples according to one embodiment of the present invention.

FIG. 4 shows the evaluation results of the hydrogen production rates in hydrogen production by thermal decomposition of methane using any one of the carbon catalysts and the comparative samples loaded with the alkaline earth metal. In FIG. 4, the horizontal axis represents temperatures (° C.) at which the thermal decomposition of methane was carried out, and the vertical axis represents hydrogen production rates per specific surface area ($\mu$mol/(min·m$^2$)) of the carbon catalyst or comparative sample at the respective temperatures.

The filled triangles represent the results of use of the carbon catalyst Mg/CA(Mn), the filled squares represent the results of use of the carbon catalyst Ca/CA(Mn), the filled inverted triangles represent the results of use of the carbon catalyst Mg/CA(Fe), the filled diamonds represent the results of use of the carbon catalyst Mg/CA(Fe)AW, the open triangles represent the results of use of the comparative sample Mg/Fe/BP, and the open squares represent the results of use of the comparative sample Mg/BP. It should be noted that, as references, the open circles represent the results of use of the comparative sample Fe/BP loaded with no alkaline earth metal shown in FIG. 1.

Figure 5:
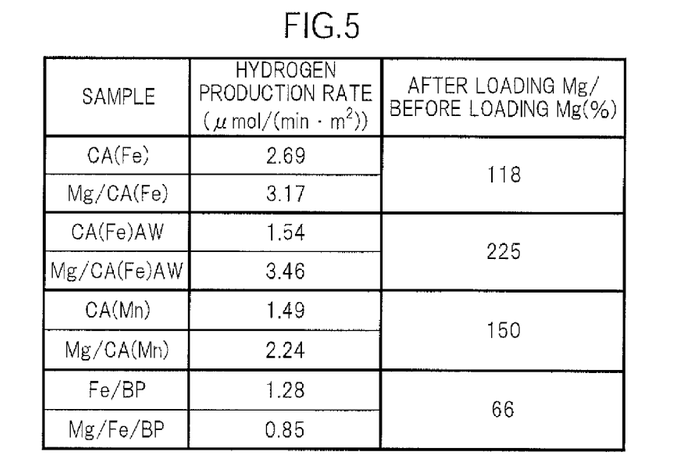
FIG. 5 An explanatory diagram showing examples of results of a comparison of hydrogen production rates of carbon catalysts before and after loading of an alkaline earth metal in Examples according to one embodiment of the present invention.

FIG. 5 shows the results of a comparison of the hydrogen production rates ($\mu$mol/(min·m$^2$)) at 900° C. of the carbon catalyst CA(Fe), carbon catalyst CA(Fe)AW, carbon catalyst CA(Mn), and comparative sample Fe/BP before and after loading of magnesium.

As shown in FIG. 4, the hydrogen production rates in the presence of the carbon catalyst loaded with magnesium or calcium are significantly higher than those in the presence of the comparative samples. In addition, as is clear from FIG. 5 and a comparison between FIG. 4 and FIG. 1, the hydrogen production rates in the cases of using the carbon catalysts increase significantly by loading magnesium on the carbon catalysts. In this regard, as shown in FIG. 5, the carbon catalysts having higher hydrogen dissociation activities shown in FIG. 3 are improved further in the catalytic activities by loading magnesium (increase ratios (%) of the hydrogen production rates shown in the column "AFTER LOADING Mg/BEFORE LOADING Mg" in FIG. 5).

On the other hand, the hydrogen production rate in the presence of the comparative sample Mg/Fe/BP is smaller than that in the presence of the comparative sample Fe/BP. That is, as shown in FIG. 5, the hydrogen production rate in the case of using the comparative sample Fe/BP even decreased by loading magnesium on the comparative sample Fe/BP. In addition, even when magnesium is loaded on the carbon catalyst BP loaded with no iron, substantially no change in the hydrogen production rate occurred compared to before loading magnesium (see FIGS. 1 and 4).

As mentioned above, the high catalytic activities of the carbon catalysts loaded with the alkaline earth metals are considered to be provided by a specific synergistic effect of a particular carbon structure of the carbon catalyst obtained by carbonizing the raw material including the organic substance and the transition metal, and characteristics of the alkaline earth metal.

The invention claimed is:

1. A carbon catalyst for hydrogen production, comprising:
 a carbonized material produced by the carbonization of a raw material including an organic substance containing a nitrogen atom and 1 to 20% by mass of iron, cobalt, nickel, or manganese; and
 an alkaline earth metal in metallic form loaded on the carbonized material produced by the carbonization;
 wherein thermal decomposition of a hydrocarbon compound and/or an oxygen-containing organic compound in the presence of the catalyst produces hydrogen.

2. The carbon catalyst for hydrogen production according to claim 1, further comprising a hydrogen dissociation activity of 10 mmol/g or more, which is calculated in a hydrogen-deuterium exchange reaction using a reaction tube filled with a predetermined weight of the carbon catalyst for hydrogen production, by dividing a total decrease in hydrogen gas by the predetermined weight when the reaction tube is heated from 40° C. to 600° C. at a temperature increase rate of 10° C./min in a mixed gas including the hydrogen gas, deuterium gas, and argon gas at a hydrogen flow rate of 10 mL/min, a deuterium flow rate of 10 mL/min, and an argon flow rate of 30 mL/min.

3. The carbon catalyst for hydrogen production according to claim 1, wherein the alkaline earth metal in metallic form is selected from the group consisting of magnesium and calcium.

4. A method of producing a carbon catalyst for hydrogen production, the method comprising:
 carbonizing a raw material including an organic substance containing a nitrogen atom and 1 to 20% by mass of iron, cobalt, nickel, or manganese; and
 loading an alkaline earth metal in metallic form on a carbonized material produced by the carbonization;
 wherein thermal decomposition of a hydrocarbon compound and/or an oxygen-containing organic compound in the presence of the catalyst produces hydrogen.

5. A method for producing hydrogen comprising thermally decomposing a hydrocarbon compound and/or an oxygen-containing organic compound in the presence of the carbon catalyst for hydrogen production according to claim 1.

6. A method for producing hydrogen comprising thermally decomposing a hydrocarbon compound and/or an oxygen-containing organic compound in the presence of the carbon catalyst for hydrogen production according to claim 2.

* * * * *